United States Patent [19]

Hardy

[11] Patent Number: 4,633,272

[45] Date of Patent: Dec. 30, 1986

[54] LASER PRINTING APPARATUS HAVING A MULTIPLE FORMATTED OUTPUT

[75] Inventor: James A. Hardy, Rochester, N.Y.

[73] Assignee: Eastman Kodak Company, Rochester, N.Y.

[21] Appl. No.: 719,171

[22] Filed: Apr. 2, 1985

[51] Int. Cl.[4] .................. G01D 9/42; G01D 9/00; G02B 26/08; G03B 27/52

[52] U.S. Cl. .................. 346/108; 346/1.1; 350/6.8; 355/55

[58] Field of Search .............. 346/1.1, 107 R, 108, 346/160; 358/293, 296, 300, 302; 350/320, 6.8; 355/44, 45, 54, 55, 56, 57

[56] References Cited

U.S. PATENT DOCUMENTS

| | | | |
|---|---|---|---|
| 3,603,727 | 9/1971 | Kinugawa et al. | 178/6.7 R |
| 3,703,334 | 11/1972 | Knechtel et al. | 355/11 |
| 3,928,759 | 12/1975 | Sansone | 350/6.8 |
| 4,116,561 | 9/1978 | Knechtel et al. | 355/57 |
| 4,129,377 | 12/1978 | Miyamoto | 355/55 |
| 4,169,275 | 9/1979 | Gunning | 358/300 |
| 4,180,822 | 12/1979 | Hudson et al. | 346/108 |
| 4,205,250 | 5/1980 | Ohara | 313/242 |
| 4,225,938 | 9/1980 | Turpin | 364/822 |
| 4,247,160 | 1/1981 | Brueggemann | 350/6.8 |
| 4,264,120 | 4/1981 | Uchiyama et al. | 350/6.8 |
| 4,353,617 | 10/1982 | Tokumitsu et al. | 350/6.8 |
| 4,379,938 | 4/1983 | Fän et al. | 546/345 |
| 4,383,755 | 5/1983 | Fedder et al. | 355/11 |

FOREIGN PATENT DOCUMENTS

59-87442  5/1984  Japan ........................ 355/56

*Primary Examiner*—E. A. Goldberg
*Assistant Examiner*—Mark Reinhart
*Attorney, Agent, or Firm*—Dennis R. Arndt

[57] ABSTRACT

A multi-format laser printer is disclosed which includes a rotating polygon having mirror facets that line scan a beam of gaussian laser light across a photosensitive member. The printer includes first and second beam shaping optical systems. Each optical system is effective when inserted into the beam path for forming a different length line scan on a photosensitive member to produce different sized prints. Each optical system includes a cylindrical mirror to provide for pyramidal error correction and optical elements preceding the polygon to anamorphically shape the beam.

8 Claims, 5 Drawing Figures

LASER PRINTING APPARATUS HAVING A MULTIPLE FORMATTED OUTPUT

BACKGROUND OF THE INVENTION

As set forth in a commonly assigned U.S. patent application Ser. No. 719,092 Apr. 2, 1985, entitled "MULTI-FORMAT LASER PRINTER" in the name of Chandler et al, a laser printer is provided which includes means for changing spot size, line scan length and page length to change the image format size while still providing pyramidal corrections.

More specifically, the laser printer in the above-identified U.S. application is shown in FIGS. 1-3. It uses a rotating polygon, at least one movable cylindrical mirror and movable lens for changing the line scan length. A parameter of the cylindrical mirror is adjusted to correct for pyramidal error at the new line scan length.

Although this arrangement provides a significant improvement in the art, it requires that the cylindrical mirror and cylindrical lenses must be moved and accurately positioned. With high speed printing, this presents technical difficulties.

SUMMARY OF THE INVENTION

The object of the invention is to change image format size without loss of information in the output image produced by a polygon laser printer without actually moving cylindrical mirrors or lenses while still preserving pyramidal error correction.

The object is achieved by a multi-format laser printer which includes a rotating polygon having mirror facets for line scanning a beam of gaussian laser light across a photosensitive member at an image zone. The printer includes first and second optical systems each effective when inserted into the optical path of the beam for forming a different line scan length on a photosensitive member. Each optical system includes a cylindrical mirror disposed between the polygon and the image plane and effective to provide pyramidal error correction by making optically conjugate in the page scan direction, the operative polygon facet and the image zone. Each optical system includes means preceding the polygon for forming in the line scan direction a beam waist, and for positioning such beam waist adjacent to the image zone. Means are provided for selectively inserting one of the beam shaping optical systems into the optical path of the beam.

BRIEF DESCRIPTION OF THE DRAWINGS

Other objects and advantages of the invention will become apparent upon reading the following detailed description in reference to the drawings, in which.

DESCRIPTION OF THE PREFERRED EMBODIMENT

As used herein, the terms "anamorphic" and "astigmatic" are interchangeable. They will generally refer to a gaussian laser light beam which is compressed or expanded in the direction perpendicular to the direction of beam travel. The term "image size" refers to the area of a two-dimensional output image at an image zone.

In order to better understand the advantages of the invention, the system for changing format size disclosed in the copending Chandler et al application will first be described.

The digital image can be provided in a number of ways, such as by scanning a beam of light through a negative onto a photodetector which provides outputs representative of the gray or brightness level of image pixels. These levels are digitized and stored in frame store memory 14.

Figure 1:
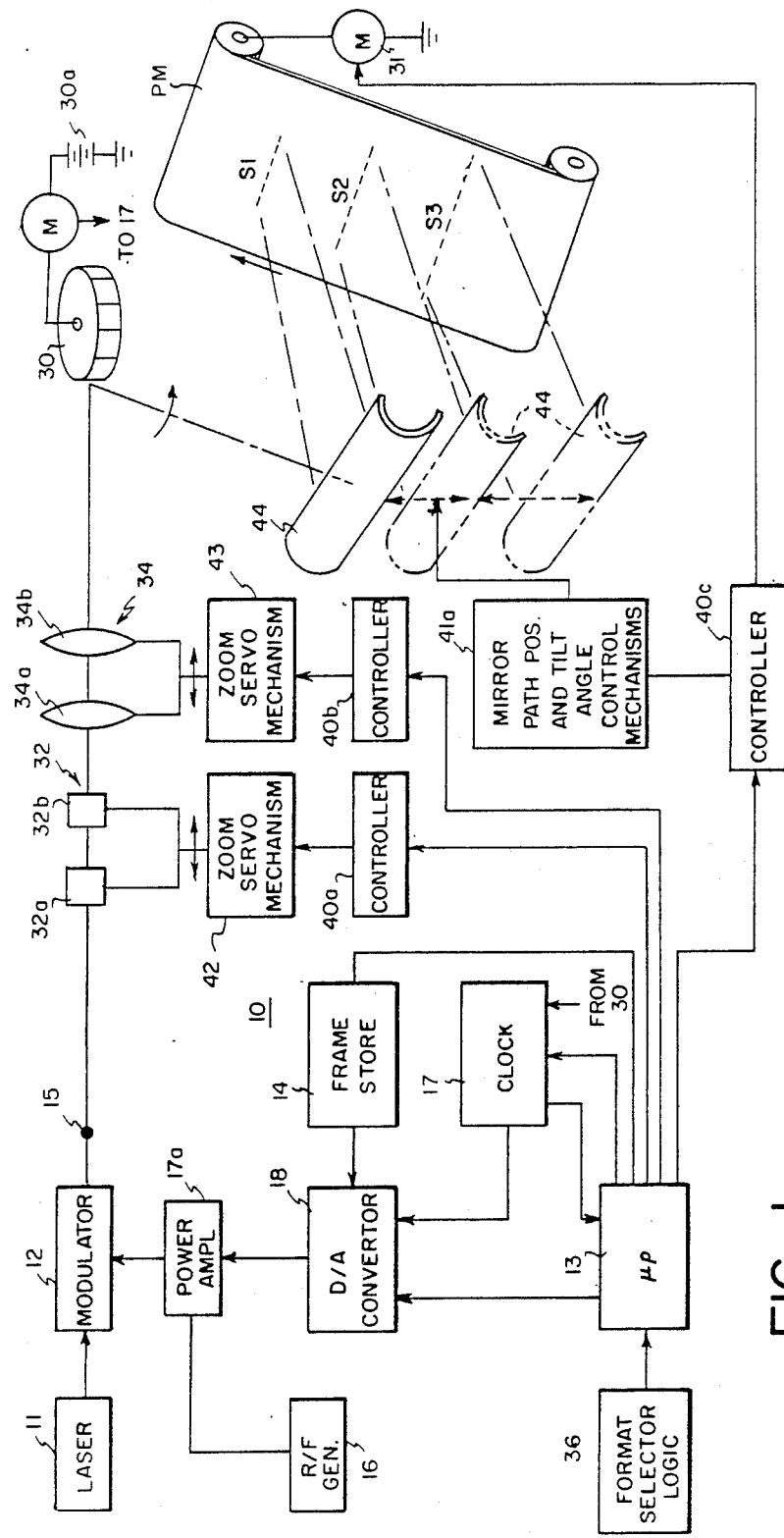
FIG. 1 is a diagram, partially in block and partially in schematic form, of a laser printer embodying apparatus for changing the output image size.

Accordingly, in FIG. 1 there is shown a laser printer 10 which includes at least one laser 11 for producing a beam of gaussian light, and a modulator 12. The beam is information modulated or discretized in brightness by the modulator 12 which may, for example, be a single beam acoustooptic modulator. Modulator 12 may include a transparent cell which is made of an acoustooptic material such as glass or $TeO_2$ crystal and a piezoelectric transducer bonded to the cell. A radio frequency (R/F) signal is produced by an R/F generator 16. This signal, at a predetermined frequency, usually in the range of 40–300 Mhz, is applied to the transducer by way of a power amplifier 17a. The power amplifier scales the amplitude of the R/F signal. The transducer launches acoustic waves in the cell which produce sonic compression waves that create a diffraction wave grating.

This diffraction grating causes a portion of the input laser light beam passing through the cell to be diffracted out of its original path. Amplitude changes of the RF signal caused by the power amplifier 17a cause intensity modulation of the diffracted (first-order) and undiffracted (zero-order) beams. The intensity of the modulated diffracted light beam varies in response to RF signal amplitude. The modulated diffracted light beam, rather than the undiffracted beam, is utilized, e.g. applied to a deflector which, as will be discussed shortly, is a polygon that converts the modulated light beam into a line scan.

A microprocessor (mp) 13 in response to a clock signal produced by a clock 17 provides a signal to a frame store memory 14 which periodically causes the gray or brightness digital level of pixels of a digital image stored in the frame store memory 14 to be applied to a D/A converter 18 that provides control signals to the power amplifier 17a. The power amplifier 17a adjusts the amplitude level of the RF signal in response to the analog signal representative of the brightness of a pixel produced by D/A converter 18. The timing of the operation of the D/A converter 18 is provided by a clock signal from clock 17. This arrangement produces a modulated circularly symmetrical gaussian light beam at position 15.

A scanning polygon 30 has a plurality of mirror facets. The operative facet deflects the modulated light beam and line scans it across a photosensitive member PM located at an image zone. Preferably, the polygon 30 is driven at a constant angular velocity by a motor 30a. The polygon 30 can be mounted on an air spindle.

The polygon 30 drives a shaft encoder (not shown) which provides an input signal to the clock 17 representative of the beam position in the line scan. In response to this input signal and a signal produced by the microprocessor 13, the clock 17 is turned on and off as a function of the desired line scan length. The line scan length is selected by an operator and provided as an input to selector logic 36. The periodicty of the clock signal is adjusted as a function of the line scan length. For example, with shorter line scan lengths, the frequency of the clock signal is increased to produce the same number of pixels per line.

As the beam is line scanned by an operative one of the mirror facets of the polygon 30, the beam forms an output image on a photosensitive member PM. The term "photosensitive member" will be understood to include a photographic film, photographic paper, a photoconductor used in a copier/duplicator, and any other means responsive to a source of light to produce an output image. The elements of this output image are also called pixels. The member PM is continuously driven in the page scan direction by a variable speed DC motor 31. The beam is line scanned at a much higher speed than the speed of the photosensitive member. Alternatively, the photosensitive member PM can be held stationary during line scans and incrementally moved in the page scan direction between line scans. It will be understood that the light beam need not be monochromatic but can also be polychromatic if the apparatus is to produce colored prints. The operation of polygons, lasers, optics, and modulators are well understood in the art. For a more complete description of their operations, see Urbach et al, "Laser Scanning for Electronic Printing", *Proceedings of the IEEE*, 597 (June, 1982).

In operation, to change the line scan length, a cylindrical mirror is moved to a new position and its tilt angle is changed to provide for pyramidal error correction. The dimension in the page scan direction is changed by adjusting the velocity of the photosensitive member PM. Anamorphic beam shaping optics precede the polygon and are adjusted for each line scan length to provide a substantially circularly symmetrical beam at the image zone.

In the laser printer 10, between position 15 and the polygon 30, there are two anamorphic beam shaping zoom lens systems 32 and 34 respectively. Each of these lens systems has at least two cylindrical lenses. Zoom lens system 32 has cylindrical lenses 32a and 32b. Zoom lens system 34 has cylindrical lenses 34a and 34b. The line scan zoom lens system 34 is positioned at all image format sizes to shape the circularly symmetrical beam (at position 15) so that the beam's waist in the line scan direction is always near or adjacent to the image zone. The page scan lens system 32 shapes the beam so that at all image format sizes the beam's waist in the page scan direction is formed near or adjacent to the operative polygon facet. Since no optical magnification power exists in the line scan direction between the reflective mirror facets on the polygon or a cylindrical mirror 44 and the photosensitive member PM, the beam size (spot size) in the line scan direction at the image zone is adjustable only by lens system 34. Lens system 32 in combination with the concave cylindrical mirror 44, adjusts the beam size (spot size) in the page scan direction at the image zone so that the beam spot of the incident on the photosensitive member PM is substantially circularly symmetrical. Exact circular symmetry may not be necessary to provide acceptable image quality.

The cylindrical mirror 44 also provides pyramidal error correction as will be described later. The beam spot size is adjusted for each output image size. At any given output image size, it is highly desirable that the beam spot size be maintained sufficiently constant as it is line scanned at the image zone to provide a high modulation transfer function (MTF) for sharp prints. In the line scan direction, this does not create a problem if the beam's waist is kept adjacent to the image zone. For laser printers of the type described using approximately 1500 spots in scan line lengths of about 100 mm, once the lens system 34 has been adjusted, there is a very small spot size change of the beam along the length of the line scan at the image zone. The spot size change that does occur will not significantly alter the line scan MTF.

In order to change the output image size, the operator provides an input into the format selector logic 36. Logic 36 provides a digital input to a microprocessor 13 which provides control signals to the frame store 14, the clock 17, and controllers 40a, 40b and 40c. The periodicity of the clock signal is adjusted to produce the new image output size. Controllers 40a and 40b respectively control the zoom lens systems 32 and 34 using drive zoom servo mechanisms 42 and 43 respectively. Controller 40c controls mirror path position and tilt angle control mechanism 41a and a motor speed controller 41b. Control mechanisms 41a control the cylindrical mirror 44 path position and tilt angle. Controller 41b controls the page scan drive mechanism that moves the photosensitive member PM.

Mechanisms 42 and 43 will be understood to each include two separate adjustment devices. The first adjustment device moves both the cylindrical lenses as a unit to a new position along the optical path and the second adjustment device controls the spacing between the lenses. For example, as discussed above, zoom lens system 34 is adjusted by mechanism 42 to shape the beam to form a beam waist in the line scan direction adjacent to member PM for each different output image format size. If, for example, the distance between the polygon 30 and the photosensitive member PM is increased by moving mirror 44 from position $A_1$, to position $A_2$ or $A_3$, controller 40b will provide an input signal to mechanism 43 which moves both lenses 34a and 34b to a new path position closer to position 15 and then adjusts the spacing between these lenses. In its new position, zoom lens system 34 changes the beam spot size in the line scan direction. The mirror 44 in a new path position, varies the beam spot size in the page scan direction at the image zone. To shape the page scan spot size, the controller 40a repositions the zoom lens system 32 to shape the beam so that a generally circularly symmetric beam spot is provided at the image zone. In general, the larger the output image size, the larger the desired spot size.

The controller 40c, in response to signals from the microprocessor 13, also provides control signals to motor speed controller 41b.

Figure 2:
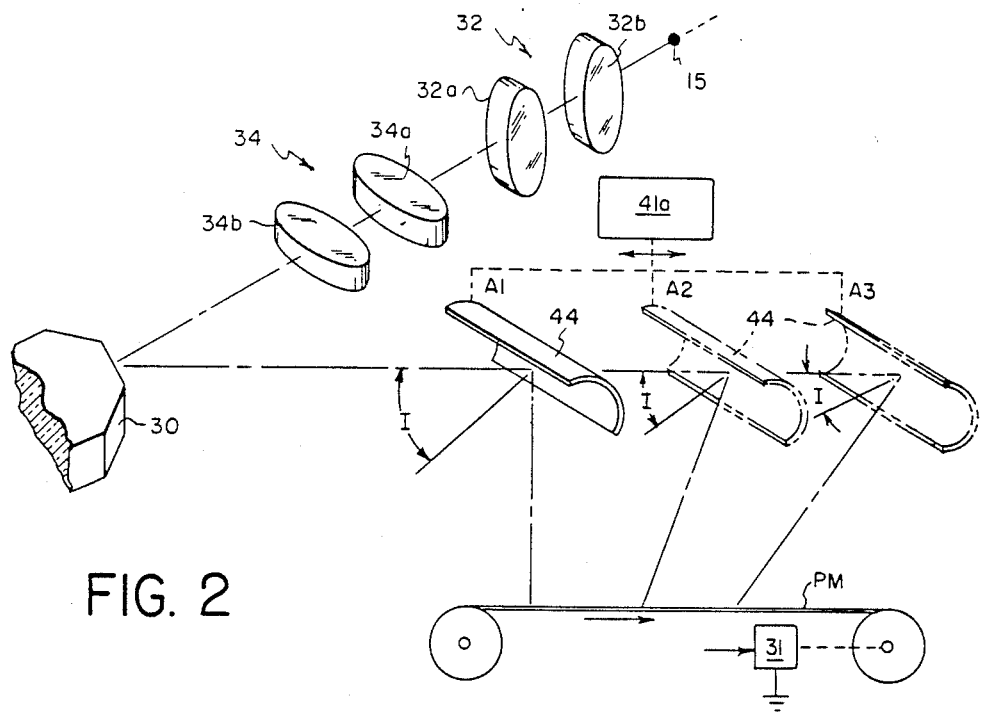
FIG. 2 shows a side perspective of a portion of the laser printer of FIG. 1.

Controller 41b adjusts the velocity of variable speed motor 31 and thereby changes the output image page scan dimension. When the mirror 44 is at position $A_1$, as shown in FIG. 2, the line scan has a length $S_1$. The member PM is continuously driven in the page scan direction at a constant velocity proportional to the applied voltage by motor 31 as the laser beam is line scanned by the polygon 30.

When the mirror 44 is moved for example from position $A_1$ to position $A_2$, (the line scan length is shown as $S_2$, where $S_2$ is greater than $S_1$), the controller 41b applies a higher voltage across motor 31. The velocity of the motor 31 is increased. Similarly at position $A_3$, where the line scan is at a length $S_3$ (its greatest length), the highest voltage is applied across motor 31. Motor 32 drives the photosensitive member PM at its highest velocity.

Each facet mirror on the polygon 30 when not perfectly assembled can have a tilt or pyramidal angle error which causes pixel position error in the page scan direction to be introduced into a light beam at the image zone. Artifacts produced in the image which are a result of pyramidal errors are known as "banding". The cylindrical mirror 44 (with optical power in only the page scan direction) makes optically conjugate the operative polygon facet and the image zone. In other words, mirror 44 forms an image of the operative facet of polygon 30 at the image zone in the page scan direction. This conjugation process corrects for pyramidal errors.

For a more complete discussion of polygon pyramidal errors and the theory behind their correction, see the above-referenced article in the *Proceedings of the IEEE* by Urbach et al.

A cylindrical mirror is preferable to a cylindrical lens if a polychromic beam is used, since a mirror optically relays an image of the beam on the operative polygon facet mirror to the member PM at all line scan angles and at multiple wavelengths without introducing refraction errors.

The distance the image zone is from the polygon is directly related to the length of the line scan. This distance can readily be changed by positioning cylindrical mirror 44 in accordance with equation (1). More specifically, the distance $(L_1+L_2)$ from the polygon to the image zone, where member PM is located, is given by the equation (assuming a substantially symmetric system):

$$L_1 + L_2 = \frac{S/\text{Tan}(\text{Alpha})}{2} \quad (1)$$

where $L_1$ is the distance along the center line of the optical axis between polygon 30 and mirror 44;

$L_2$ is the distance along the center line of the optical axis between mirror 44 and member PM;

S is the length of a scanned line at the image zone; and

Alpha is the half field angle which is determined by the polygon duty cycle.

Once the mirror 44 is moved to change the line scan, then changes must be made to at least one mirror parameter (R,I) to continue to correct for pyramidal errors. More specifically, the operative facet of the polygon 30 and the image zone must again be made conjugate. The following is a mathematical statement of the relationship which produces this conjugation:

$$\frac{1}{L_1} + \frac{1}{L_2} = \frac{2}{R \cos(I)} \quad (2)$$

where

R is the radius of curvature of mirror 44;

I is the tilt angle of the mirror 44 which is the angle between where the center line of the light beam contacts the mirror surface and a normal engages the mirror surface at such point of contact; and $L_1$ and $L_2$ are as defined above.

As noted above, it is desirable that the lens system 34 "image" the line scan beam waist so it is adjacent to the image zone for constant MTF considerations. In the embodiment shown in FIG. 1, the values of R and I are selected to satisfy equation (2). Because the radius R is fixed, only the tilt angle I can be adjusted.

As illustrated in FIG. 2, by decreasing the tilt angle I of the cylindrical mirror 44, the relationship of equation (1) can be satisfied at longer distances $(L_1+L_2)$. The microprocessor 13 provides appropriate control signals to controller 40c which positions the mirror 44 and adjusts its tilt angle I to satisfy equation (1). As discussed above, at larger output image sizes, the velocity of the member PM must be increased in the page scan direction because of longer line scan lengths. This adjustment is made by motor speed controller 41b.

While the operative polygon mirror facet must be optically conjugate with the image zone, the optical magnification or power need not be unity. Stated another way, the spot size of the beam on the facet may be larger than the spot size of the beam on the photosensitive member. In fact, it is desirable to have an optical magnification of less than unity to minimize the effect on the beam of any surface defects in the polygon facet mirrors.

The line scan length is changed by altering the distance between the polygon and the photosensitive member PM and then moving the cylindrical mirror to a new optical path position. Also, by properly selecting tilt angle I to satisfy equation (2), the cylindrical mirror 44, in the page scan direction, optically conjugates the polygon facet mirror with the image zone and corrects for pyramidal errors. The combination of the zoom lens systems 32, 34, polygon 30 and cylindrical mirror 44 shape the beam so that it has the appropriate size at the image zone. The result of this process is to make the image zone optically conjugate with position 15.

The following is a specific example, with two image formats, one with a scan length of 4' and the other with a scan length of 5'. The cylindrical mirror 44 radius R is 92.2 mm. In scan line direction the beam waists are 0.04 and 0.05 mm radius ($e^{-2}$) and they are located 2 mm and 2.5 mm into the photosensitive member PM. At position 15, the beam radius is 0.05 mm. The wavelength is 0.633 microns. The scan direction zoom lens has two cylindrical lenses. Lens 34a with a focal distance of −62.7 mm and 34b with a focal distance of 175 mm. The distances from position 15 to lens 34a for the two formats are 31.55 and 60.81 mm, the distances from lens 34a to 34b are for the two formats 296.6 and 231.8 mm and the distance from lens 34b and the image drum are 289.8 and 524.2 mm.

In the page direction there are provided two cylindrical lenses 32a with a focal distance of 50 mm and 32b with a focal distance of 200 mm. The distances from position 15 to lens 32a for the two formats are 44.75 and 43.47 mm, between 32a and 32b 175.9 and 115.9 mm, and between lens 32b and the polygon 30, the distances are 299.4 and 360.7 mm. The distances from the polygon 30 to the cylindrical mirror 44 are 159.6 and 182.2 mm, the tilt angles I of the mirror are 46.25° and 33.94°. The distances from mirror 44 to the drum are 39.9 and 33.94 mm. In this example, the photosensitive member was in the form of a drum. The drum's radius is 53.7 mm and the beams' incidence angles onto the drum in the page direction are 90°. At the drum, the beam radii in the page direction are 0.059 and 0.074 mm, respectively. For two or more formats, the line direction zoom lens may consist of three lenses.

Figure 3:
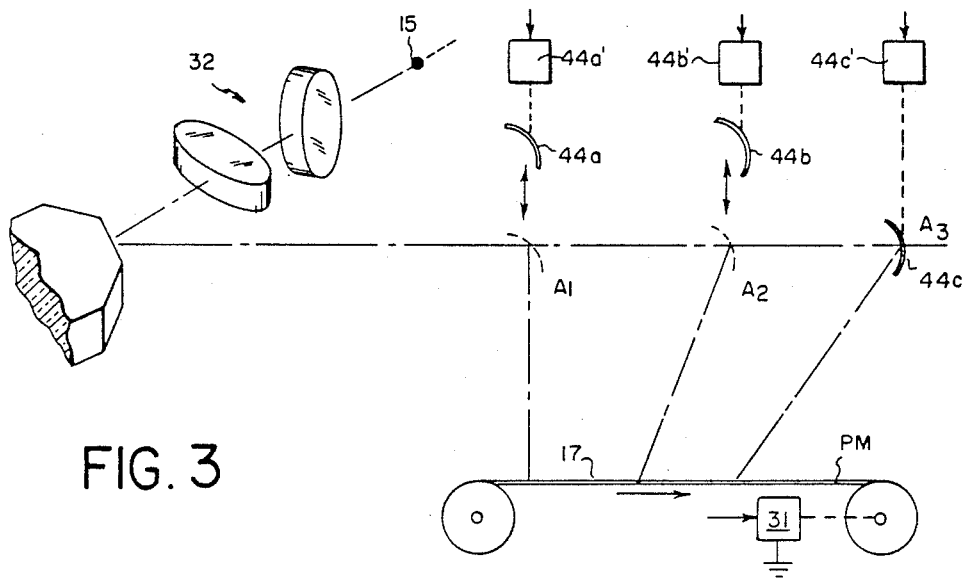
FIG. 3 shows a side perspective of a portion of the laser printer embodying apparatus in accordance with the invention for changing output image size.

FIG. 3 shows an embodiment similar to that in FIGS. 1 and 2, except that cylindrical mirrors 44a, 44b and 44c are selectively moved into and out of the optical path of the laser beam. In operation, one of the solenoids 44a', 44b', and 44c' is energized by controller 40c and moves its mirror 44 into the optical path. At this time, the other solenoids are energized in an opposite sense by controller 44c to withdraw their mirrors from the optical path. By careful selection of R and I parameters to satisfy equation (2) which not only provide pyramidal correction but also provide the desired magnification in the page scan direction at the image zone, the need for a page scan zoom lens system can be obviated. Each one of the three different mirrors 44a, 44b, is used in providing a different output image size. Each cylindrical mirror has a different radius R and a different tilt angle I. The system previously described is capable of printing only a single length scan line. In order to print large quantities of images of substantially different dimensions, it is necessary that the optical system of the single format described above be changed to accommodate different formats. Incorporation of a mechanical format change will enhance the versatility and productivity of the complete system.

Thus it can be seen that the Chandler et al system described in detail above requires a number of complex and difficult-to-control operations. The precise control required to move the zoom lens systems 40a and 40b with the servo mechanisms 42 and 43 respectively, makes the individual components in the system very costly to manufacture and assemble. Also needed is the control mechanism 41a that controls the cylindrical mirror 44 path position and tilt angle. In order to move the large number of components required to change format size, one can readily see that the precise control and close tolerances required would increase the initial cost of the components involved, decrease the reliability of the system as a whole, and increase field service cost.

Figure 4:
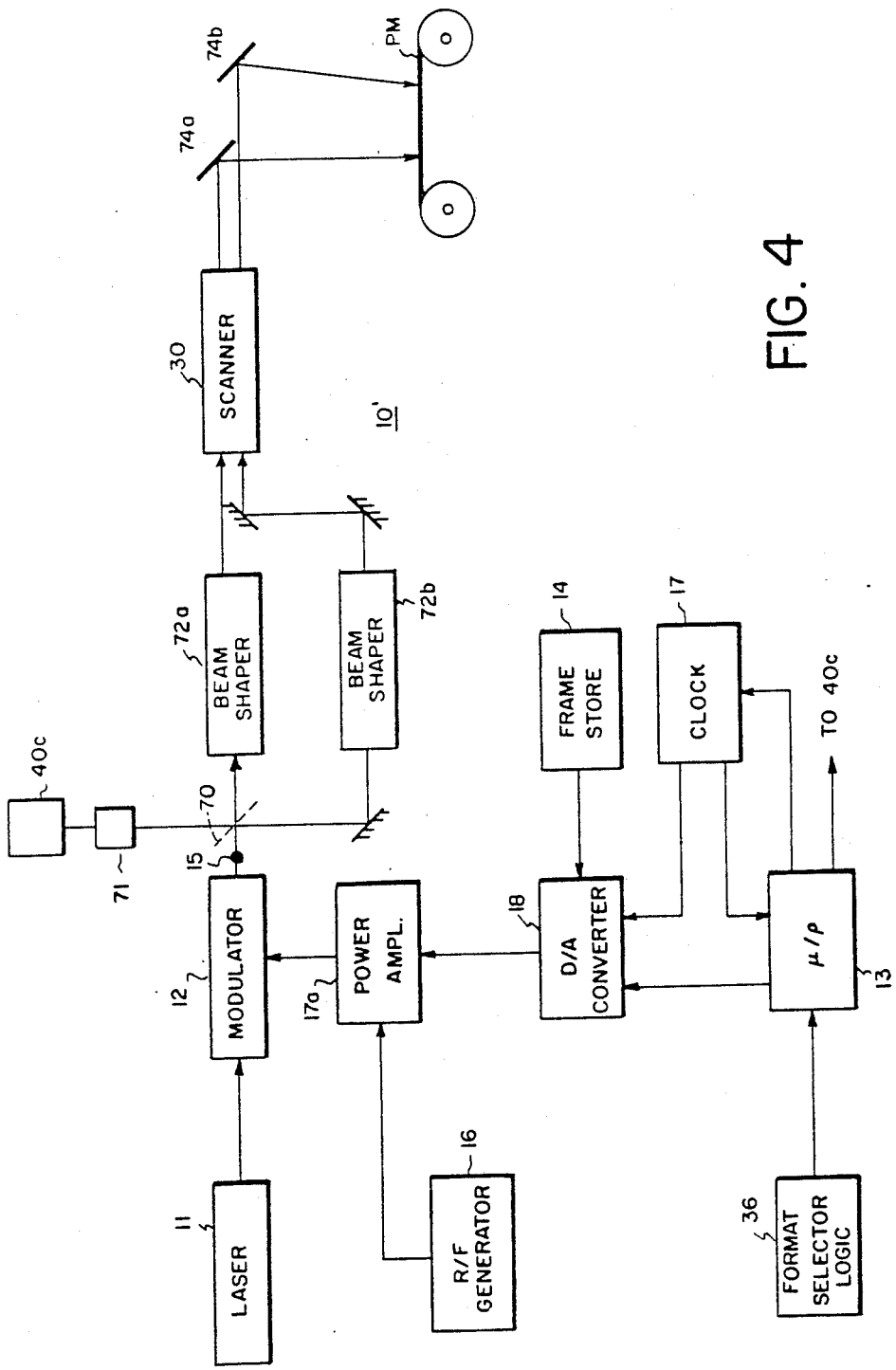
FIG. 4 is a block diagram of a laser printer in accordance with the invention which includes two separate optical systems which can be selectively inserted into a beam path by positioning a mirror.

Turning now to FIG. 4, a block diagram arrangement of laser printer 10' in accordance with the invention is shown. The printer 10' includes at least one laser 11, modulator 12, frame store memory 14 and a microprocessor 13, which form a circularly symmetrical beam spot at position 15. It will be understood that the printer 10' also includes an R/F generator 16, power amplifier 17a, D/A converter 18, clock 17 and format selector logic 36. It will be understood that controllers 40a, 40b and 40c are also provided.

A mirror 70 is movable by a solenoid 71 between two positions under the control of driver 40c. In its first position (solid line), the mirror 70 does not intercept the beam of laser light and the beam is incident upon a first optical system which includes an anamorphic beam shaping system 72a and a fixed cylindrical mirror 74a. The fixed cylindrical mirror 74a conjugates the polygon and the image zone to correct for pyramidal errors in accordance with the conditions of equations (1) and (2). The beam is line scanned by the polygon 30 on a continuously moving photosensitive member PM.

As a specific example, the fixed cylindrical mirror 74a, has a radius of 120.142 mm, an angle of incidence of 40.136°, and is located 131.479 mm from the polygon and 70.621 mm from the photosensitive member. The photosensitive member is wrapped on a drum with a radius of 76.2 mm. The scan line created is approximately 100 mm long.

To select the second optical system, the mirror 70 is moved to its second position where it intercepts the beam and reflects the beam to beam shaping system 72b and by way of several mirrors, onto the polygon scanner 30. A cylindrical mirror 74b conjugates the polygon and the image zone to correct for pyramidal errors at the new line scan length in accordance with equations (1) and (2). The second optical system includes system 72b and mirror 74b.

As a specific example, the fixed cylindrical mirror 74b, has a radius of 131.479 mm, an angle of incidence of 27.746°, and is located 202.659 mm from the polygon and 93.341 mm from the photosensitive member. The scan line created is approximately 150 mm long.

Figure 5:
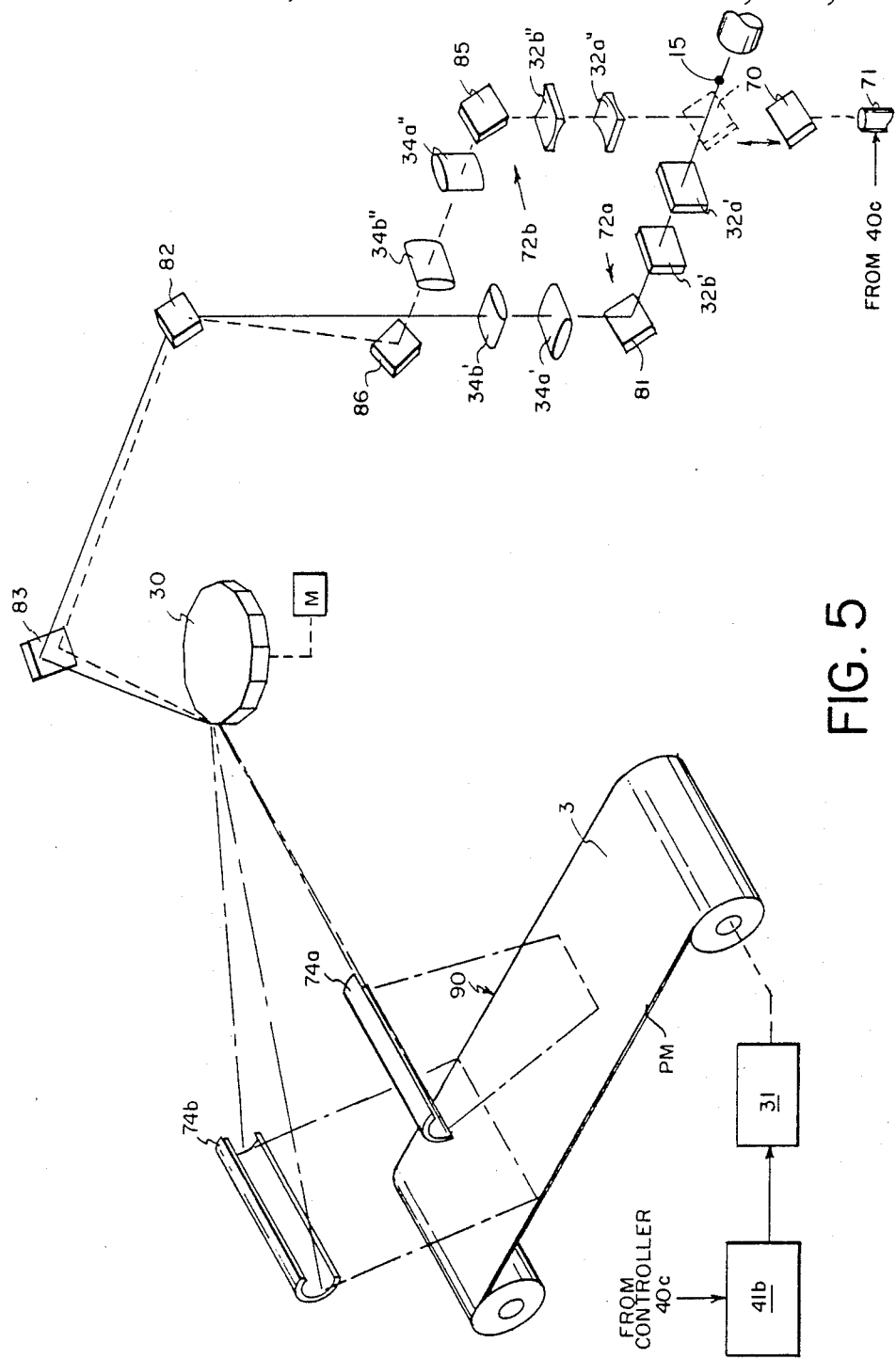
FIG. 5 is a detailed diagram of the optical system of the laser printer shown in FIG. 4.

Turning now to FIG. 5 where the laser printer 10' is shown in more detail, beam shaping system 72a includes fixed line and page scan beam shaping lens elements. More specifically, cylindrical lens elements 32a' and 32b' shape the beam in the line scan direction while lens elements 34a' and 34b' shape the beam in the page scan direction. Beam shaping system 72b also includes fixed line and page scan beam shaping lens elements. More specifically, cylindrical lens elements 32a'' and 32b'' shape the beam in the line scan direction so that a beam waist is formed adjacent to the image zone, while lens elements 34a'' and 34b'' shape the beam in the page scan direction.

For an example of the FIG. 3 embodiment, we will use the same input and output conditions as in the previous example. Also, the same lenses 34 are used and the position of lenses 32 are fixed at their locations for the 4" format. Two different mirrors 44, one with a radius of 83.1 mm and the other with a radius of 117.5 mm are employed. The distances from the polygon 30 to the mirrors 44 are 158.3 and 226.1 mm, respectively, and the tilt angles I of these mirrors are 40.34° and 23.62°, respectively. The distances from the mirrors 44 to the photosensitive member are 39.6 and 70.6 mm, respectively. In this example, the photosensitive member was in the form of a drum. The drum's radius is 50.8 mm and the beams' incidence angles onto the drum a in the page direction are 90°. At the drum, the beam radii in the page direction are 0.059 and 0.074 mm, respectively.

It is well known in the art to design the shapers as interleaved cylindrical optical systems. However, it may be more economical to design the line direction beam forming optics with conventional spherical optics and follow this with a cylindrical optical system to re-shape the beam to provide the required page direction beam size at the polygon. This reduces by one-half the cylindrical optics required for the shaper and enhances manufacturability.

If the optical system were to be modified as described above, the two cylindrical lenses 32a' and 32b' in optical system 72a would be replaced by three spherical lenses. The first spherical lens would have a focal length of +60 mm and would be located 37.201 mm from point 15 (reference point shown in FIGS. 2 and 3). The beam waist at location 15 has a radius of 55.45 microns and a wavelength of 633 nm. The second spherical lens would have a focal length of −20 mm, and would be located 154.452 mm from the first lens. The third spherical lens would have a focal length of +160 mm, and would be positioned 176.847 mm from the second lens. The first of two cylindrical lens elements has a focal length of 118.052 mm and is located 131.922 mm from the third spherical lens. The second and final cylindrical lens is located 128.343 mm from the first cylindrical lens and has a focal length of 24.767 mm. The distance from this second cylindrical lens to the polygon is 421.235 mm. Mirrors 81, 82, and 83 would continue to be used to direct the beam onto the surface of the operative facet of the polygon 30.

The optical system 72b would also contain the same number of lenses as the above-described modifications to optical system 72a. Accordingly, the three spherical lenses would have the following specifications: The first cylindrical lens would be located 44.498 mm from point 15 and would have a focal length of +50 mm. The second lens would be 89.672 mm from the first and would have a focal length of −20 mm. The third lens would be 271.590 mm from the second lens and would have a focal length of +225 mm. The first cylindrical lens element is located 115.532 mm from the third spherical lens and would have a focal length of 190.403 mm. The second and last cylindrical lens would be located 178.760 mm from the first cylindrical lens and would have a focal length of 21.091 mm. This last lens is also 403.948 mm from the polygon, with the beam using mirrors 86, 82, and 83 to reach the polygon after passing through the modified optical system 72b. (Note: Decimal places carried in the preceding examples are for computational consistency and are not meant to imply tolerances required in component or assembly fabrication.)

When the first optical system is inserted into the path, the light beam is not intercepted by mirror 70 and the beam is shaped by beam shaping system 72a. Mirrors 81, 82 and 83 are also provided to direct the beam to be incident onto the surface of the operative facet of the polygon 30. From this facet the beam is reflected off fixed cylindrical mirror 74 onto the photosensitive member PM.

When mirror 70 is inserted into the optical path, beam shaping system 72b operates upon the beam. Also mirrors 85, 86, 82 and 83 direct the beam to be incident upon the operative facet of polygon but displaced from the point where the first beam intercepts the operative polygon facet. The separation at the operative polygon facet between the beam from shaper 72a and 72b is adequate for the beam from shaper 72b to pass beneath cylindrical print mirror 74a and be reflected by cylindrical print mirror 74b instead. The beam reflected from cylindrical print mirror 74b is then directed onto the photosensitive member PM. The photosensitive member PM is driven by a motor 31 operated by a controller 41b to adjust the velocity of the moving member PM. When the first optical system is inserted into the beam path, the line scan is longer than when the second optical system is inserted into the beam path and the velocity of member PM must be increased.

Thus, it can be seen that the format changing system of the present invention will have significant impact on reducing the cost over the prior art format changing system previously disclosed.

Control mechanisms to move components and assure proper motion are reduced from five to one and the remaining control mechanism is required to control the precise location of a single component.

Lens mounts will also have impact on the system cost. Because the subject invention reduces the number of moving mechanisms from five to one, the reliability of the format change operation would improve by a factor of about five. In the zoom system, each shaper mount must reproduce the five points in space required to locate a thick cylindrical optic and the mirror mount must reproduce the four points in space required to locate a simple cylinder. Thus, it can be seen that the total of twenty-four (24) constrained points in space for the zoom system contrasts sharply with the three points required to be reproduced by the plane mirror used as a beam diverting device in the subject invention.

While the number of optical components in the shaper increases from at least five to approximately ten, the tolerances on these components are reduced since the design is not constrained by the need to zoom components. However, the cost of optical components probably will increase by less than a factor of two. As with the optical component count, the number of mounts must also increase but because they are nearly identical, their total cost will not increase proportionately. In addition, the complexity of the mounts has been decreased by a factor of eight.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fully within the spirit and broad scope of the appended claims.

For example, it should be understood that this format change system could be used with a laser printer that uses a galvanometer mirror scanner for line scanning in place of the multi-faceted rotating polygon.

I claim:

1. In a multi-format laser printer which includes a rotating polygon having mirror facets for line scanning a beam of gaussian laser light across a photosensitive member movable in a page scan direction at an image zone, the improvement comprises:
   (a) first and second optical systems each effective when the optical path of the beam passes therethrough for forming a different line scan length on a photosensitive member, each of said optical systems including a cylindrical mirror disposed between the polygon and the image zone and effective to operate on the beam to provide pyramidal error correction by making the operative polygon facet and the image zone optically conjugate in the page scan direction;
   (b) means in each of said first and second optical systems preceding the polygon and effective to operate on the beam to form in the line scan direction a beam waist and position such beam waist adjacent to the image zone; and
   (c) means for establishing the beam path through a selected one of the optical systems.

2. The invention as set forth in claim 1, wherein said cylindrical mirrors have different radii of curvature and tilt angles.

3. The invention as set forth in claim 2, wherein said optical system inserting means includes a mirror movable between first and second positions for respectively inserting said first and second optical systems into the optical path of the beam.

4. The invention as set forth in claim 3, wherein said laser printer further includes means for continuously moving the photosensitive member at a constant velocity, and means for changing the velocity of such photosensitive member when the image format size is changed.

5. In a multi-format laser printer which includes a rotating polygon having mirror facets for line scanning a beam of gaussian laser light across a photosensitive member at an image zone, the improvement comprises:
   (a) first and second optical systems each effective when the optical path of the beam passes therethrough for forming a different line scan length on a photosensitive member, each of said optical systems including:
   (i) a cylindrical mirror disposed between the polygon and the image zone and effective to operate on the beam to provide pyramidal error correction by making the operative portion of the polygon facet and the image zone optically conjugate in the page scan direction;
   (ii) means preceding the polygon and effective to operate on the beam to form in the line scan direction a beam waist and position such beam waist adjacent the image zone;
   (iii) means effective to operate on the beam to produce predetermined beam size adjustment in the page scan direction; and
   (b) means for selectively establishing the beam path through a selected one of the optical systems.

6. In a multi-format laser printer which includes a rotating polygon having mirror facets for line scanning a beam of gaussian laser light across a photosensitive member at an image zone, the improvement comprises:
   (a) a mirror movable between first and second positions;
   (b) first and second optical systems;
   (c) first and second cylindrical printing mirrors in respective ones of said optical systems, each mirror when enabled by said movable mirror being optically conjugate with a portion of the operative polygon facet and the image zone;
   (d) when said mirror is in said first position, said laser beam is directed toward a first portion of said operative polygon facet and onto said first cylindrical printing mirror which images a first line scan length on said photosensitive member; and
   (e) when said mirror is in said second position said laser beam is directed toward a second portion of said operative polygon facet and onto said second cylindrical printing mirror which images a second line scan length on said photosensitive member.

7. The invention as set forth in claim 5 further including means for adjusting the velocity of the photosensitive member as a function of the optical system enabled.

8. In a multi-format laser printer which includes a nutating mirror galvanometer for line scanning a beam of gaussian laser light across a photosensitive member at an image zone, the improvement comprises:
   (a) a mirror movable between first and second positions;
   (b) first and second optical systems each effective when the optical path of the beam passes therethrough for forming a different line scan length on a photosensitive member, and each of said optical systems including:
   (i) first and second cylindrical printing mirrors in respective ones of said optical systems, each mirror when enabled by said movable mirror being optically conjugate with a portion of the galvanometer mirror and the image zone;
   (ii) when said mirror is in said first position, said laser beam is directed toward a first portion of said galvanometer mirror and onto said first cylindrical printing mirror which images a first line scan length on said photosensitive member; and
   (iii) when said mirror is in said second position, said laser beam is directed toward a second portion of said galvanometer mirror and onto said second cylindrical printing mirror which images a second line scan length on said photosensitive member.

* * * * *